US009849688B2

(12) United States Patent
Ono

(10) Patent No.: US 9,849,688 B2
(45) Date of Patent: Dec. 26, 2017

(54) DENSITY DETERMINATION METHOD, DENSITY DETERMINATION APPARATUS, DENSITY DETERMINATION PROGRAM, AND PROGRAM RECORDING MEDIUM

(71) Applicant: SEIKO EPSON CORPORATION, Tokyo (JP)

(72) Inventor: Satoru Ono, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/346,382

(22) Filed: Nov. 8, 2016

(65) Prior Publication Data

US 2017/0136777 A1    May 18, 2017

(30) Foreign Application Priority Data

Nov. 17, 2015  (JP) ................. 2015-224723

(51) Int. Cl.
| | | |
|---|---|---|
| B41J 2/175 | (2006.01) | |
| B41J 2/21 | (2006.01) | |
| B41J 2/205 | (2006.01) | |
| B41J 2/36 | (2006.01) | |

(52) U.S. Cl.
CPC ......... B41J 2/17566 (2013.01); B41J 2/2103 (2013.01)

(58) Field of Classification Search
CPC ... B41J 2/36; B41J 2/362; B41J 2/2056; B41J 2/2054; B41J 2/17566; B41J 2/2103
See application file for complete search history.

(56) References Cited

U.S. PATENT DOCUMENTS

2010/0207972 A1*  8/2010  Kawai .................. H04N 1/482
                                                               347/6
2013/0106935 A1*  5/2013  Hoshii .................. B41J 2/2054
                                                               347/14

FOREIGN PATENT DOCUMENTS

| JP | 2003-011397 A | 1/2003 |
| JP | 2005-238465 A | 9/2005 |
| JP | 2007-176025 A | 7/2007 |

* cited by examiner

*Primary Examiner* — Jason Uhlenhake
(74) *Attorney, Agent, or Firm* — Foley & Lardner LLP

(57) ABSTRACT

A density determination method includes a first process, a second process, and a third process. In the first process, ink is discharged onto a medium to print a plurality of colorimetric patches having mutually different densities on the medium so as to allow each of the colorimetric patches to include a base portion serving as a background of the each of the colorimetric patches and a low density portion forming a symbol and having a density lower than a density of the base portion. In the second process, images each associated with a corresponding one of the colorimetric patches are acquired. In the third process, a maximum printing density value for the medium is determined on the basis of a result of recognizing the symbol through each of the images, having been acquired in the second process.

11 Claims, 6 Drawing Sheets

US 9,849,688 B2

DENSITY DETERMINATION METHOD, DENSITY DETERMINATION APPARATUS, DENSITY DETERMINATION PROGRAM, AND PROGRAM RECORDING MEDIUM

BACKGROUND

1. Technical Field

The present invention relates to a density determination method, a density determination apparatus, a density determination program, and a program recording medium that, in a printing technology for printing an image on a medium, determine a maximum value of the density of the image.

2. Related Art

In printing apparatuses that perform printing of an image on a medium by discharging inks onto the medium, the higher the density of colors obtained by the respective inks is, the higher the ability of representing the image is, and as a result, the realization of high image quality printing is facilitated. When, however, a density upper limit value is not provided, the amount of the discharged inks exceeds the ink absorption amount of the medium, and as a result, problems, such as unclearness of edge portions of an output image due to the blurring and leaking of the inks, and the degradation of the reproducibility of lines and letters, occur. Thus, in a conventional way, the density upper limit value has been determined by printing a plurality of colorimetric patches having mutually different densities on a medium, and visually determining the printed colorimetric patches. This density upper limit value differs depending on a medium type. For example, the density upper limit value is high for a medium whose ink absorption amount is relatively high, and the density upper limit value decreases as the ink absorption amount decreases. In addition, in this specification, a density upper limit value that enables printing on the medium to be performed without causing any one of the above problems will be hereinafter referred to as "a maximum printing density value for the medium".

When the maximum printing density value for a medium is obtained by the visual determination, it is inevitable that individual differences exist among the results of determinations made by persons responsible for the visual determination. The reproducibility, therefore, may be a disadvantage of the above conventional technology. Thus, for example, a technology disclosed in JP-A-2005-238465 has been proposed as a technology to be applied in substitution for the visual determination. This technology disclosed in JP-A-2005-238465 is a technology in which OD values of individual colorimetric patches are detected by colorimetry equipment and a maximum printing density value is determined on the basis of the result of the detection.

According to the technology disclosed in JP-A-2005-238465, however, there is a need for printing the colorimetric patches having various densities. Thus, in a high density patch region where colorimetric paths each having a relatively high density are printed among a surface region of a medium, one or more unfavorable phenomena in relation to ink, such as cockling, leaking of ink, and dripping of ink, are likely to occur. The cockling is a phenomenon in which the medium absorbs a large amount of ink and, as a result, the printing region on the surface of the medium becomes an undulant state. The occurrence of such one or more phenomena may bring the medium into contact with a head of a printing apparatus, may cause ink having dripped from the medium to be adhered to the printing apparatus, and/or may stain an installation place of the printing apparatus.

SUMMARY

An advantage of some aspects of the invention is that, in a printing technology for printing an image on a medium, a density determination technology that enables a maximum printing density value for the medium to be determined without causing any one of defects, such as cockling, is provided.

The above density determination technology is realized as the following aspects of the invention.

According to a first aspect of the invention, a density determination method includes a first process, a second process, and a third process. In the first process, ink is discharged onto a medium to print a plurality of colorimetric patches having mutually different densities on the medium so as to allow each of the colorimetric patches to include a base portion serving as a background of the each of the colorimetric patches and a low density portion forming a symbol and having a density lower than a density of the base portion. In the second process, images each associated with a corresponding one of the colorimetric patches are acquired. In the third process, a maximum printing density value for the medium is determined on the basis of a result of recognizing the symbol through each of the images, having been acquired in the second process.

In the above density determination method, according to the first aspect of the invention and having been configured in such a way as described above, in order to determine the maximum density value, the plurality of colorimetric patches, having mutually different densities, are printed on the medium. Here, in each of the colorimetric patches, the density of the low density portion is lower than that of the base portion, and thus, naturally, the amount of ink constituting the base portion is larger than that of the low density portion. Further, in a colorimetric patch in which the density is increased to a degree that brings about the degradation of printing quality, ink having a relatively large amount is discharged onto the base portion and, as a result, is likely to exceed the ink absorption amount of the medium in the base portion. In this case, ink having exceeded the ink absorption amount is flown into the low density portion. This configuration enables the occurrence of blurring and leaking of ink from the relevant colorimetric patch to be effectively prevented. Further, the flowing of the ink into the low density portion deforms the symbol, and this deformation of the symbol degrades the recognition of the symbol. That is, the use of the result of recognition of the symbol enables a determination as to whether or not the amount of discharged ink is appropriate to be made reasonably and with high reproducibility. Accordingly, the density determination method enables the maximum density value to be determined without causing any one of defects, such as cockling. In addition, the "symbol", which is formed in each of the colorimetric patches, encompasses a letter, a digit, a mark, and any other similar symbol. Further, the "low density portion" in each of the colorimetric patches means, among a surface region on which the colorimetric patches are printed, a region onto which no ink is discharged or a region on which ink having an amount smaller than the mount of ink discharged onto the base portion is discharged. Further, when ink having been discharged onto the base portion exceeds the ink absorption amount of the medium and overflown ink is flown into the low density portion, a situation where the flowing of the ink is effectively blocked by the low density portion to a degree that does not deform the symbol will be hereinafter expressed by a phrase "ink is trapped".

Here, the third process may be configured so as to include a process of acquiring a colorimetric patch having a highest density among at least one colorimetric patch which constitutes the colorimetric patches and for each of which the symbol has been recognized, and determining that a density at a time when the acquired colorimetric patch, having the highest density, has been printed on the medium is the maximum printing density value. That is, the fact that the symbol has been recognized means that the amount of the ink does not exceed the ink absorption amount of the medium in the base portion, and the execution of the above third process enables a maximum printing density value to be determined so as to allow the maximum printing density value to be close to the limit and not to exceed the ink absorption amount of the medium. As a result, the execution of the above third process enables an image to be printed with high quality in a state in which the variation of the density of the image is broadened.

Further, in the first process, a density of the base portion may be set so as to be changed for each of the colorimetric patches to make the densities of the colorimetric patches different from one another, and a density of the low density portion may be set to a density lower than the density of the base portion of any one of the colorimetric patches. Here, the density of the base portion and the density of the low density portion may be set independently from each other, and the low density portion serves as a portion that prevents the occurrence of blurring and leaking of ink from the colorimetric portion by trapping the ink flown from the base portion. Accordingly, the aforementioned configuration, in which the density of the low density portion is set to a low density, enables the ink flown from the base portion to be trapped by the low density portion with certainty, and enables the occurrence of blurring and leaking of ink to be effectively prevented.

In order to effectively trap the ink flown into the base portion in this way, it is preferable to print the colorimetric patches on the medium by discharging the ink onto only the base portion. That is, a configuration that makes the symbol a so-called outline symbol by discharging no ink onto the low density portion enables the ink blurring or leaking from the base portion to be trapped by the low density portion with certainty.

Further, in each of the colorimetric patches, a plurality of the low density portions may be provided relative to the base portion. With this configuration, a plurality of symbols are contained in one colorimetric patch, and thus, the accuracy of the recognition of the symbol is increased. Further, this increase of the accuracy of the recognition of the symbol enables the maximum density value to be determined with higher accuracy.

Further, the plurality of low density portions may be disposed so as to be two-dimensionally distributed relative to the base portion. This configuration enables, even when the blurring and leaking of ink occurs in any portion of the base portion, such ink to be trapped by the low density portion with certainty. Further, this configuration, in which the low density portions are distributed, increases the accuracy of the recognition of the symbol, and thus enables the maximum density value to be determined with higher accuracy.

Further, the symbol may correspond to either a letter or a digit for each of the colorimetric patches. This is because a large number of engines capable of recognizing letters and digits with high accuracy are already provided, and such engines are able to be utilized as they are. In addition thereto, the utilization of such an engine increases the accuracy of the recognition of the symbol, and thus, enables the maximum density value to be determined with higher accuracy.

Further, while the density of the colorimetric patch is low, the blurring and leaking of ink do not occur, and with an increase of the density, a point at which the blurring and leaking of ink begin to occur appears. This point exactly corresponds to the maximum printing density value. Thus, in order to detect the point, at which the blurring and leaking of ink begin to occur, the recognition ratio of the symbol is monitored, and when the point has been detected at a specific colorimetric patch, the density of the specific colorimetric patch may be determined as the maximum printing density value. This configuration enables the maximum printing density value to be objectively determined.

Further, according to a second aspect of the invention, a density determination apparatus includes a patch control section and a printing density determination section. The patch control section controls a printing apparatus that performs printing by discharging ink onto a medium to allow the printing apparatus to print a plurality of colorimetric patches having mutually different densities on the medium so as to allow each of the colorimetric patches to include a base portion serving as a background of the each of the colorimetric patches and a low density portion forming a symbol and having a density lower than a density of the base portion. The printing density determination section determines a maximum value of the densities each associated with a corresponding one of the colorimetric patches on the basis of a result of recognizing the symbol through an image of each of the colorimetric patches, printed on the medium.

In the above density determination apparatus, according to the second aspect of the invention and having been configured in such a way as described above, the density maximum value is determined on the basis of a result of recognizing the symbol, included in each of the colorimetric patches, through the image of each of the colorimetric patches, printed on the medium by the printing apparatus. Accordingly, similarly to the above density determination method, the density determination apparatus enables the density maximum value to be determined without causing any one of defects, such as cockling.

Here, the density determination apparatus may be configured to further include an imaging section configured to acquire the images, each associated with a corresponding one of the colorimetric patches, by imaging the colorimetric patches, printed on the medium, and to supply the acquired images to the printing density determination section. This configuration enables the images of the respective colorimetric patches to be acquired with certainty and with high accuracy, and thus, enables increase of the accuracy of determination of the maximum density value.

Further, according to a third aspect of the invention, a density determination program allows a computer incorporated in or coupled to a printing apparatus that performs printing by discharging ink onto a medium to execute processing including a process of printing a plurality of colorimetric patches having mutually different densities on the medium so as to allow each of the colorimetric patches to include a base portion serving as a background of the each of the colorimetric patches and a low density portion forming a symbol and having a density lower than a density of the base portion; a process of acquiring images each associated with a corresponding one of the colorimetric patches, printed on the medium; a process of determining a maximum printing density value for the medium on the basis of a result of recognizing the symbol through each of the acquired images. Further, a fourth aspect of the invention is a program recording medium configured to record the above density determination program and to be readable by the computer. Allowing the computer to operate in accordance with the above density determination program configured in such a way as described above enables the maximum density value to be determined without causing any one of defects, such as cockling, similarly to the above density determination method.

It is to be noted here that all of the plurality of constituent elements included in each of the individual aspects of the invention are not essential, and in order to achieve part of or all of advantageous effects described in this specification, with respect to partial constituent elements among the plurality of constituent elements, modification, deletion, replacement with a new other constituent element, and deletion of part of limited contents may be performed as needed. Further, in order to achieve part of or all of advantageous effects described in this specification, part of or all of technical features included in one of the aforementioned aspects of the invention may be combined with part of or all of technical features included in another one of the aforementioned aspects of the invention to obtain an independent aspect of the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
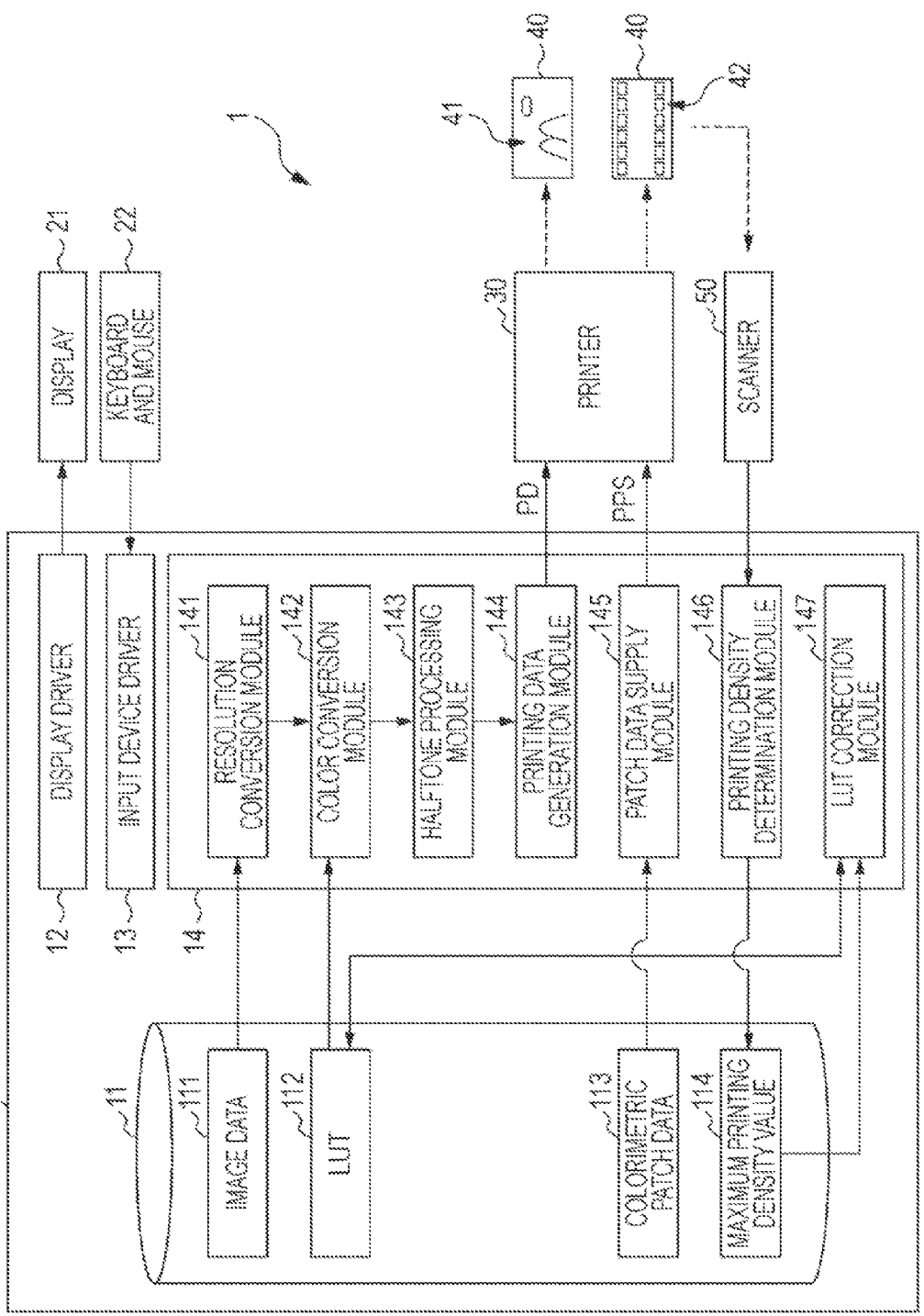
FIG. 1 is a diagram illustrating a configuration of a printing system including a density determination apparatus according to the invention.

FIG. 1 is a diagram illustrating a schematic configuration of a printing system including an embodiment of the density determination apparatus according to the invention. This printing system includes a computer serving as a density determination apparatus, a printer serving as a printing apparatus, and a scanner serving as an imaging apparatus. The computer 10 includes a CPU serving as a central device of arithmetic processing, a ROM and a RAM serving as storage media, and any other component, these components being omitted from illustration, and executes predetermined application programs, a density determination program, and any other program while using peripheral devices, such as a HDD 11. The computer 10 is coupled to a display 21 via a display driver 12, and operation input devices 22, such as a keyboard and a mouse, via an input device driver 13.

Further, a printer driver 14 is installed in the computer 10, and has the function of outputting a set of printing data PD to a printer 30 in accordance with an application program, and allowing the printer 30 to print a color image 41 on a sheet-shaped medium 40. That is, the printer driver 14 includes a resolution conversion module 141, a color conversion module 142, a halftone processing module 143, and a printing data generation module 144. The resolution conversion module 141 receives a set of image data 111, and convers its resolution into a printing resolution. The set of image data 111 is generated in accordance with the application program, and is stored in the HDD 11. A set of image data having been subjected to the resolution conversion in this way is a set of image information represented by three RGB color constituents. Further, the color conversion module 142 converts, for each pixel, the set of RGB image data into a set of multi-grayscale-level data corresponding to a plurality of ink colors utilizable by the printer 30 while referring to a color conversion look-up table (hereinafter referred to as an "LUT") 112, which is stored in the HDD 11.

The set of multi-grayscale-level data, resulting from the color conversion, includes combinations of grayscale values each being one of, for example, 256 grayscale levels. The halftone processing module executes so-called halftone processing to generate a set of halftone image data. Pieces of image data constituting the halftone image data are rearranged into pieces of image data to be transferred to the printer 30 by the printing data generation module 144, and then, the rearranged pieces of image data are output as a final set of printing data PD. In addition, the set of printing data PD includes pieces of ink amount data each indicating a state of forming a corresponding one of dots during an execution of main scanning.

Further, the printer driver 14 includes a patch data supply module 145. This patch data supply module 145 allows the printer 30 to print colorimetric patches in accordance with the density determination program. The patch data supply module 145 reads, from the HDD 11, a set of data related to colorimetric patches used for determining a maximum printing density value corresponding to a medium (hereinafter, this set of data being referred to as "a set of colorimetric data 113"), and supplies a patch printing signal PPS to the printer 30. The patch printing signal PPS is a signal for allowing the printer 30 to print colorimetric patches 42 on the medium 40. As described above, the printer driver 14 has a printing control function, that is, the function of supplying the printing data PD and the patch printing signal PPS to the printer 30 to allow the printer 30 to print the color image and the colorimetric patches.

Further, the printer driver 14 receives a set of imaged data output from the scanner 50. More specifically, when the scanner 50 has imaged the plurality of the colorimetric patches 42, having been printed on the surface of the medium 40 by the printer 30, a set of imaged data including images each associated with a corresponding one of the plurality of colorimetric patches 42 (each of the images being referred to as a "patch image" hereinafter) is supplied to the printing density determination module 146, included in the printer driver 14. The printing density determination module 146 has a density determination function, that is, the function of recognizing symbols included in the patch images on the basis of the set of imaged data, and determining a maximum printing density value for the medium 40 on the basis of the results of the recognition processes (i.e., recognition ratios). Further, upon determination of a maximum printing density value, the printing density determination module 146 updates a maximum printing density value stored in the HDD 11 into the maximum printing density value having been determined this time.

Moreover, the printer driver 14 includes an LUT correction module 147 so as to correspond to the updating of the maximum printing density value corresponding to the medium 40. The LUT correction module 147 has an LUT correction function, that is, the function of reading the maximum printing density value stored in the HDD 11 and correcting the LUT 112 when needed.

The density determination program, for use in realizing the aforementioned various functions, is supplied in the form of being recorded in a recording medium readable by a computer. Examples of a medium utilizable as such a recording medium readable by a computer include, but are not limited to, a flexible disc, a CD-ROM, a magneto-optical disc, an IC card, a ROM cartridge, punch cards, a printed material on which codes, such as bar cords, are printed, an internal storage device (memory such as RAM or ROM) included in a computer, and an external storage device of a computer. Further, such computer programs can be downloaded to the computer 10 via the Internet. The computer 10, in which the printer driver 14 has been installed in such a way, not only serves as a printing control apparatus that supplies the printing data PD to the printer 30, and allows the printer 30 to print the color image 41 (FIG. 1), but also serves as a density determination apparatus that supplies the patch printing signal PPS to the printer 30 to allow the printer 30 to print the colorimetric patches 42 (FIG. 1), and that determines a maximum printing density value on the basis of patch images.

Figure 2:
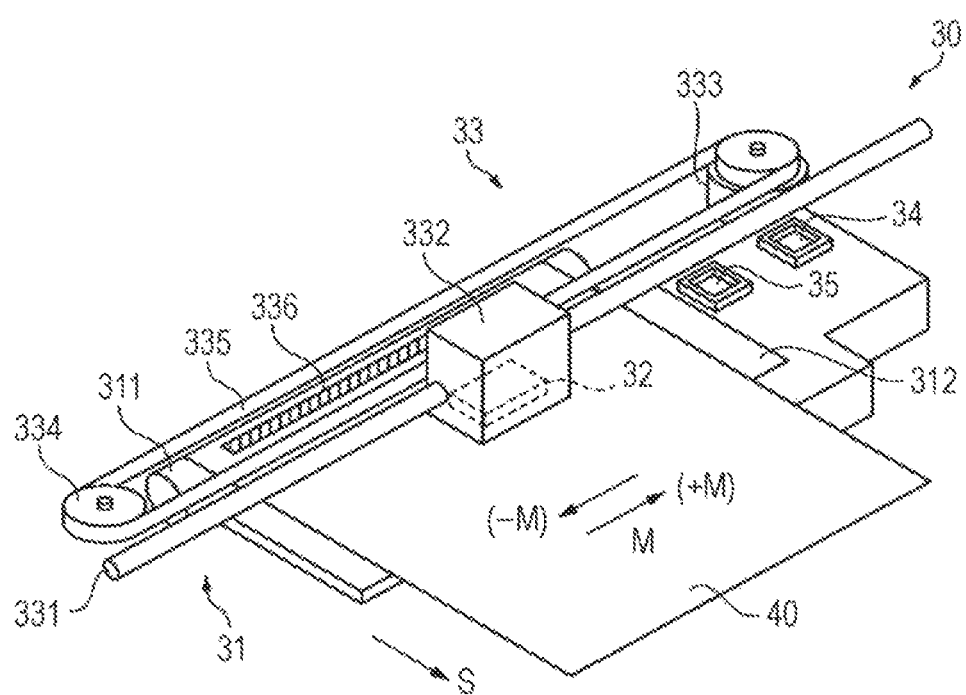
FIG. 2 is a perspective view of a printer illustrated in FIG. 1 illustrating an internal mechanism of the printer.

FIG. 2 is a perspective view of an ink jet recording apparatus, an example of the printer shown in FIG. 1, illustrating the internal mechanism of the ink jet recording apparatus. An internal mechanism described below is provided inside the printer 30. This internal mechanism includes a transport portion 31, a head unit 32, a scanning portion 33, a cap portion 34, a flushing portion 35, and any other component. Among these components, the transport portion 31 includes a transport motor (omitted from illustration), a transport driving roller 311, a transport driven roller (omitted from illustration), a suction platen 312, and any other member. The transport driving roller 311 and the suction platen 312 are arranged in this order along a transport direction S in which the medium 40 is transported. Upon actuation of the transport motor in response to a control instruction from a unit control portion (omitted from illustration), the transport driving roller 311 is drivingly rotated by the transport motor. The transport driving roller 311 rotates pressing the medium 40 to feed the medium 40 onto the suction platen 312, located at the front side of the transport driving roller 311.

The suction platen 312 has a horizontal and flat surface, and supports the medium 40, having been fed by the transport driving roller 311, from below. The suction platen 312 includes a large number of suction holes communicated with a pressure reduction source, such as a suction fan, on the surface of the suction platen 312, to suction the medium 40. With this configuration, the suction platen 312 keeps the medium 40, having a curling tendency, in a flat state at a position below the head unit 32. Further, a smooth guide face is formed at the front edge of the suction platen 312 so as to allow the fed-out medium 40 to be smoothly guided toward below.

The head unit 32 includes a head and a head controller. The head includes a plurality of nozzles, and while being moved in a reciprocating direction M (FIG. 2) by the scanning portion 33, the head discharges ink droplets through each of the nozzles in accordance with drive instructions from the head controller. With this operation, dot lines (raster lines) along the reciprocating direction M are formed on the medium 40.

As shown in FIG. 2, the scanning portion 33 includes a guide rail 331, a carriage 332, a carriage motor 333, and any other component. The guide rail 331 is disposed so as to horizontally extend in a long-length direction of the guide rail 331. Further, the carriage 332 mounts the head unit 32, and is disposed so as to horizontally reciprocate (scan) along the guide rail 331 in the reciprocating direction M while being supported by the guide rail 331.

A timing belt 335 is disposed at the rear side of the guide rail 331 so as to be laid across a pair of pulleys 334. One of the pulleys 334 is coupled to a rotation shaft (omitted from illustration) of the carriage motor 333. The timing belt 335 is disposed so as to be movable in parallel to the guide rail 331 between the pulleys 334. Further, a portion of the timing bolt 335 is coupled to the carriage 332. Thus, these configurations allow the carriage motor 332 to, upon actuation of the carriage motor 333 in response to a control instruction from the unit control portion (omitted from illustration), move in the reciprocating direction M.

Further, a linear scale 336 is disposed in parallel to the reciprocating direction M. The linear scale 336 includes a transparent body and light shielding bars formed at constant intervals along the reciprocating direction M. Meanwhile, the carriage 332 includes a carriage detector for detecting the light shielding bars. This configuration, therefore, allows the result of the detection by the carriage detector to be output to a controller of the unit control portion so as to allow the controller to detect the amount of the movement of the carriage 332 with accuracy.

In this way, the scanning portion 33 allows the head unit 32 to move and scan with a high accuracy to allow ink droplets to be discharged onto the medium 40 so as to form an image formation region, that is, a region on which an image is formed, on the medium 40. Further, the carriage 332 is configured to be movable across the medium 40 in the reciprocating direction M, and in a region at the outside of the suction platen 312 in the reciprocating direction M, the flushing portion 35 and the cap portion 34, each serving as a maintenance unit, are disposed in series. Further, the head unit 32 is configured to, upon actuation of the carriage motor 333 in response to a control instruction from the unit control portion, be movable to each of a portion above the flushing portion 35 and a portion above the cap portion 34. For example, the carriage 332 (the head unit 32) is caused to move to the portion above the flushing potion 35, and to discharge inks through predetermined ones of the nozzles so as to be subjected to a flushing operation. Meanwhile, the flushing portion 35 absorbs the discharged inks. Such a flushing operation removes inks with their viscosities increased from the head unit 32.

Further, the cap portion 34 air-tightly seals the lower face of the head unit 32 during a halt of the operation of the ink jet recording apparatus (the printer 30) to prevent the viscosity increase or hardening of inks in the head unit 32.

In addition, in this embodiment, as shown in FIG. 2, the flushing portion 35 is disposed at only one outside of the scanning region of the head unit 31, but the disposition of the flushing portion 35 is not limited to this configuration, and the flushing portion 35 may be disposed at both outsides of the scanning region. The disposition of the flushing portion 35 at both outsides of the scanning region enables the length of the scanning region to be made longer relative to the same flushing time interval.

The printer 30 configured in such a manner as described above performs printing of an image by discharging inks in a plurality of colors, such as cyan (C), magenta (M), yellow (Y), and black (K), onto the medium 40 on the basis of the set of printing data PD. Here, when, although the ink absorption capability of the medium 40 is small, the usage amounts of the CMYK inks are too large, the blurring of ink occurs on the printed image and this phenomenon is likely to degrade the image quality. In contrast thereto, when, although the ink absorption capability of the medium 40 is sufficient, the usage amounts of the CMYK inks are too small, the image density becomes thin, and in this case, similarly, the image quality is also likely to be degraded. For this reason, in this embodiment, the computer 10 controls the individual portions of the printing system 1 and executes printing control processing (the printing of colorimetric patches, the determination of a maximum printing density value, the correction of the LUT 112, and the printing of an image) on the basis of the program provided via a recording medium (omitted from illustration) or the Internet. Hereinafter, the printing control processing, performed by the computer 10, will be described with reference to FIG. 3.

Figure 3:
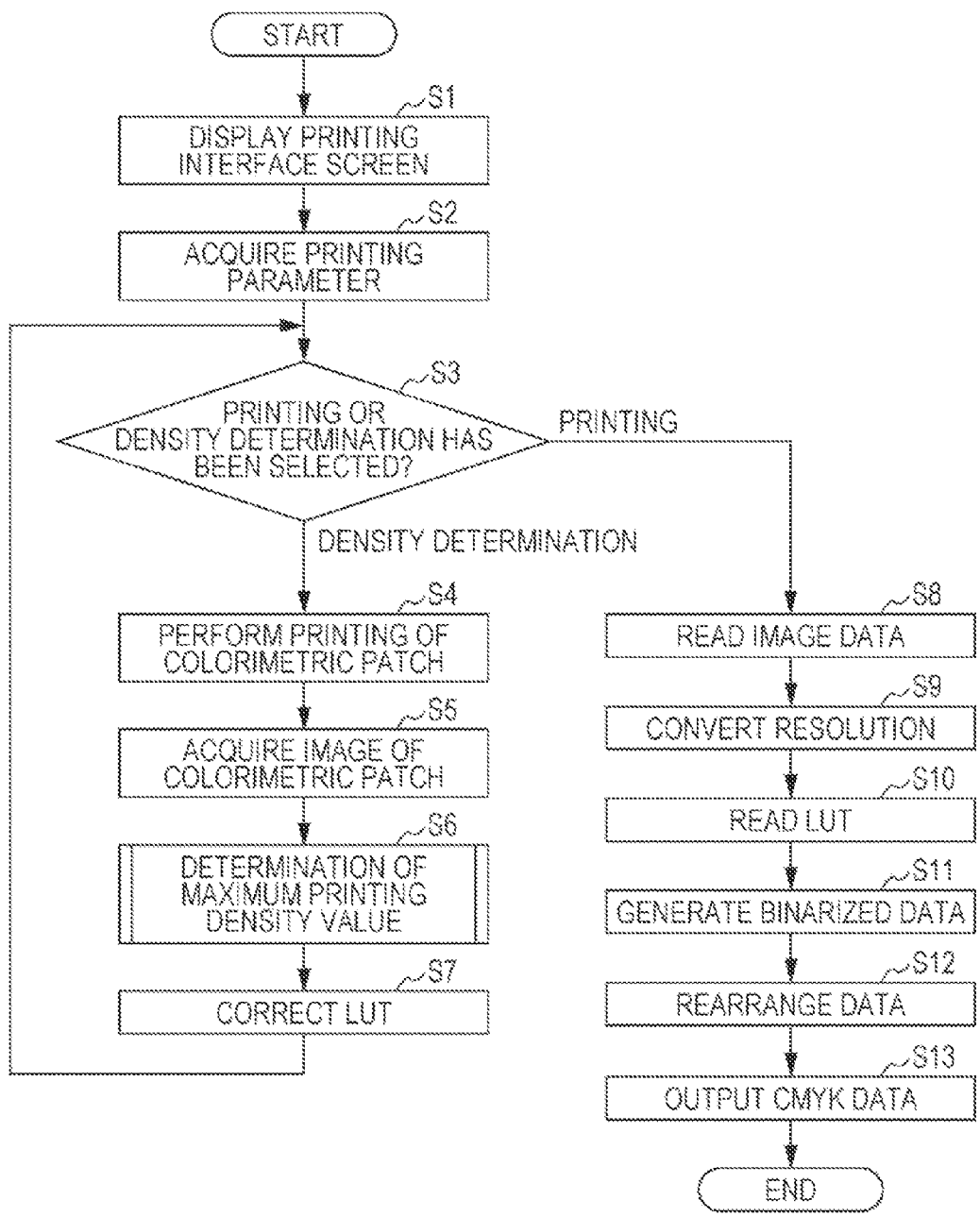
FIG. 3 is a flowchart illustrating control processing executed by a computer illustrated in FIG. 1.
Figure 4:
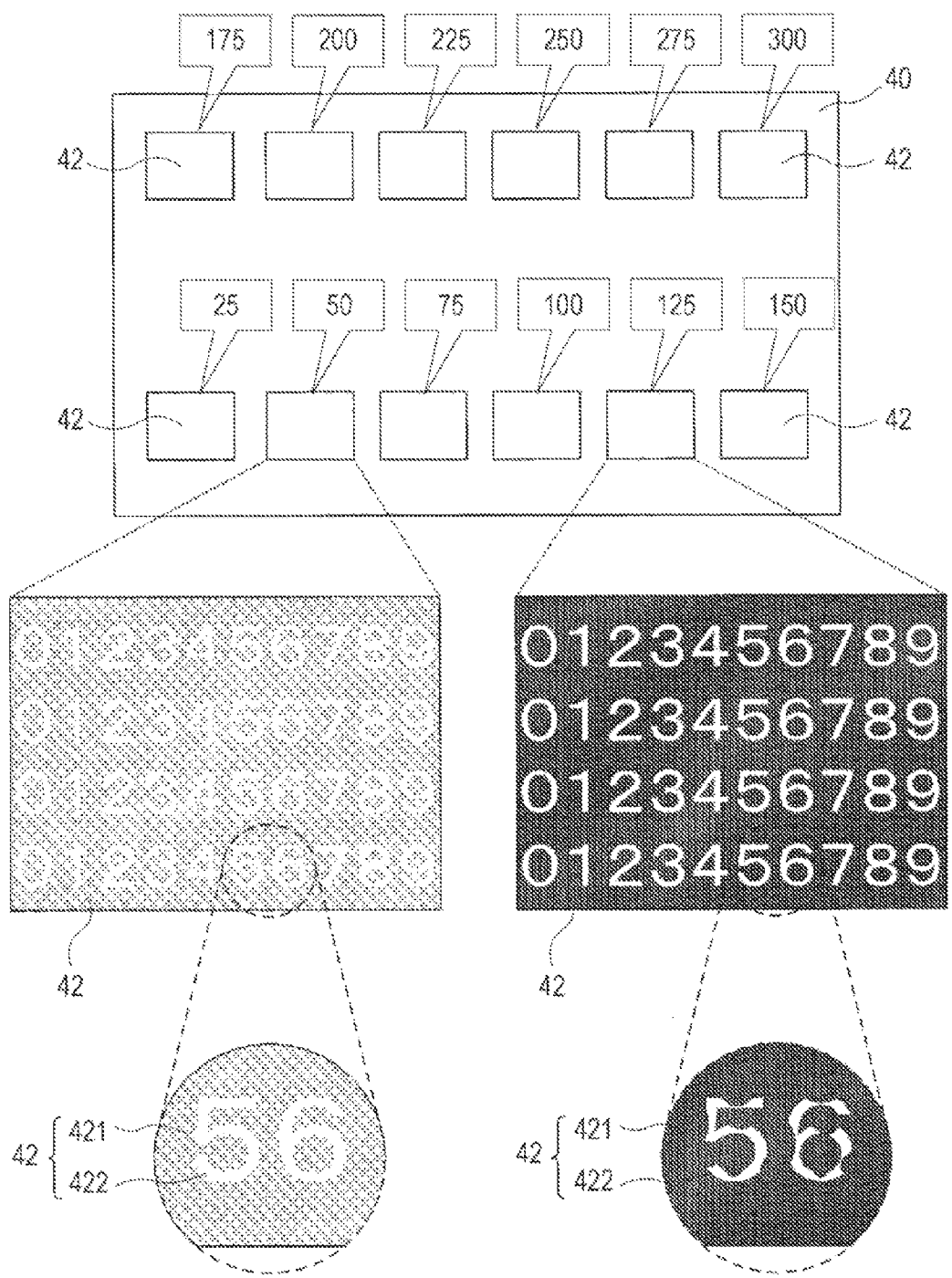
FIG. 4 is diagram schematically illustrating an example of colorimetric patches printed during an execution of printing control processing.

FIG. 3 is a flowchart illustrating printing control processing executed by the computer shown in FIG. 1. Further, FIG. 4 is a diagram schematically illustrating an example of colorimetric patches printed during an execution of the printing control processing. When a program is started, the computer 10 displays a printing interface screen (omitted from illustration) on the display 21 (step S1). On the printing interface screen, an input field in which a medium type is selectively input; an input field in which an instruction for instructing a printing range operationally input; various buttons, such as a printing button and a maximum printing density determination button, are displayed. Subsequently, the computer 10 receives operation inputs having been input to the input field from the operation input devices 22, such as a keyboard and a mouse, and acquires various printing parameters on the basis of the contents of the operation inputs (step S2). Further, the computer 10 causes the process flow to be branched to each of processes in accordance with a mouse operation on a corresponding one of the various buttons. Here, a case in which the maximum printing density determination button is clicked and the density determination (i.e., the printing of the colorimetric patches, the determination of the maximum printing density value, and the correction of the LUT 112) is made (steps S3 to S7) and a case in which the printing button is clicked and normal printing that allows an image corresponding to the set of printing data 111 to be printed is executed (steps S8 to S13) will be described, and the contents of other processes are omitted from description.

Upon click operation of the maximum printing density determination button in step S3, the printer driver 14 reads pieces of colorimetric patch data 113, stored in the HDD 11, and supplies the patch printing signal PPS, used for allowing the printer 30 to print colorimetric paths corresponding to the pieces of colorimetric patch data 113, to the printer 30. With this process, the colorimetric patches 42, having mutually different densities such as shown in an example of FIG. 4, are printed. In addition, in this embodiment, each of the colorimetric patches 42 is printed so as to cause its ink usage amount to be changed step-by-step with a constant step difference within a preset density range. That is, in this embodiment, the density of each of the colorimetric patches 42 is changed by changing a recording duty of each of inks for use in printing of the each of the colorimetric patches 42, and the sum of the recording duties corresponds to the density of the each of the colorimetric patches 42, that is, the patch density of the each of the colorimetric patches 42. Further, each of totally twelve colorimetric patches 42 is printed so as to cause its patch density to be changed step-by-step with a step difference "25" within a preset density range "25" to "300". In FIG. 4, digits in a box-shaped portion pointing each of the colorimetric patches 42 denote the patch density of the relevant colorimetric patch 42.

The density range and the step difference of the colorimetric patches 42 are not limited to the above setting values, but may be optionally determined. Further, the total number of the colorimetric patches 42 may be changed in accordance with the density range and the step difference. Further, the density range and/or the step difference of the colorimetric patches 42 may be configured so as to be optionally settable. That is, a configuration that allows a patch printing setting screen to be displayed on the display 21 before the execution of the process in step S4 and thereby enables a user to set the density range and/or the constant density difference may be employed. Examples of a field and a button that may be displayed on the patch printing setting screen include, but are not limited to, a paper type selection field in which a type of the medium 40 is selectively input; a path density range selection field in which the range of a recording duty of each of inks is selectively input; a duty change amount selection field in which a step size value indicating with what percentage the recording duty is to be changed step-by-step to print each of the colorimetric patches 42 so as to cause its patch density to be changed step-by-step with a constant step difference is selectively input, and an OK button. Further, a configuration may be may be made such that, when a selection is made and the OK button is clicked by a user, allows the above selection fields to receive the inputs by the user and allows the colorimetric patches 42 to be printed on the medium 40 on the basis of the contents of the inputs.

Here, one of the technical features of this embodiment is the configuration of the colorimetric patches 42. As schematically illustrated in a middle portion and a lower portion of FIG. 4, each of the colorimetric patches 42 is constituted by a base portion 421 and low density portions 422. The base portion 421 is a portion printed with a parch density ("25", "50", . . . , or "300") specified by the patch data supply module 145 of the printer driver 14. Each of the low density portions 422 is a portion not supplied with any ink. Further, the base portion 421 has a rectangular shape as a whole; while the low density portions 422 are disposed so as to be distributed inside the base portion 421, and each of the low density portions 422 forms one of outline digits ("0", "1", "2", . . . , "9") on the base portion 421, a background. That is, a plurality of outline digits are printed as symbols inside the base portion 421. Thus, as shown in a schematic diagram illustrated in a lower-left portion of FIG. 4, the flow of ink into the low density portion 422 from the base portion 421 is not recognized; while, as shown in a schematic diagram illustrated in a lower-right portion of FIG. 4, when the patch density is high, the blurring and leaking of ink from the base portion 421 occur. In this embodiment, however, the ink having been flown out from the base portion 421 is flown in and trapped by the low density portion 422. This configuration, therefore, blocks ink from dripping from the medium 40, and thereby, eliminates or minimizes the adherence of the ink to the printer 30, the staining of an installation place of the printer 30, and any other unfavorable influence due to the dripping of ink.

Further, when the patch density is appropriate, the outline digit (symbol) is able to be clearly recognized; while, when the patch density is excessive, the low density portion 422 is deformed by the flowing of ink into the low density portion 422 and, as a result, the outline digit is difficult to be recognized. That is, a correlation exists between the recognition of the outline digit and the patch density, and this correlation enables a determination as to whether or not the patch density is appropriate to be made on the basis of a recognition ratio in relation to the outline digit.

Thus, in this embodiment, the computer 10 displays a message for prompting a user to set the medium 40, on which the colorimetric patches 42 are printed, on the scanner 50, together with the OK button and any other button, on the display 21. Further, when the user has set the medium 40 onto the scanner 50 and has clicked the OK button, the scanner 50 performs imaging of the colorimetric patches (step S5). With this operation, a set of image data in relation to the images of the respective colorimetric patches 42 is acquired, and then, is supplied to the printing density determination module 146. Subsequently, the printing density determination module 146 performs processing for determining a maximum printing density value on the basis of the set of image data (step S6).

Figure 5:
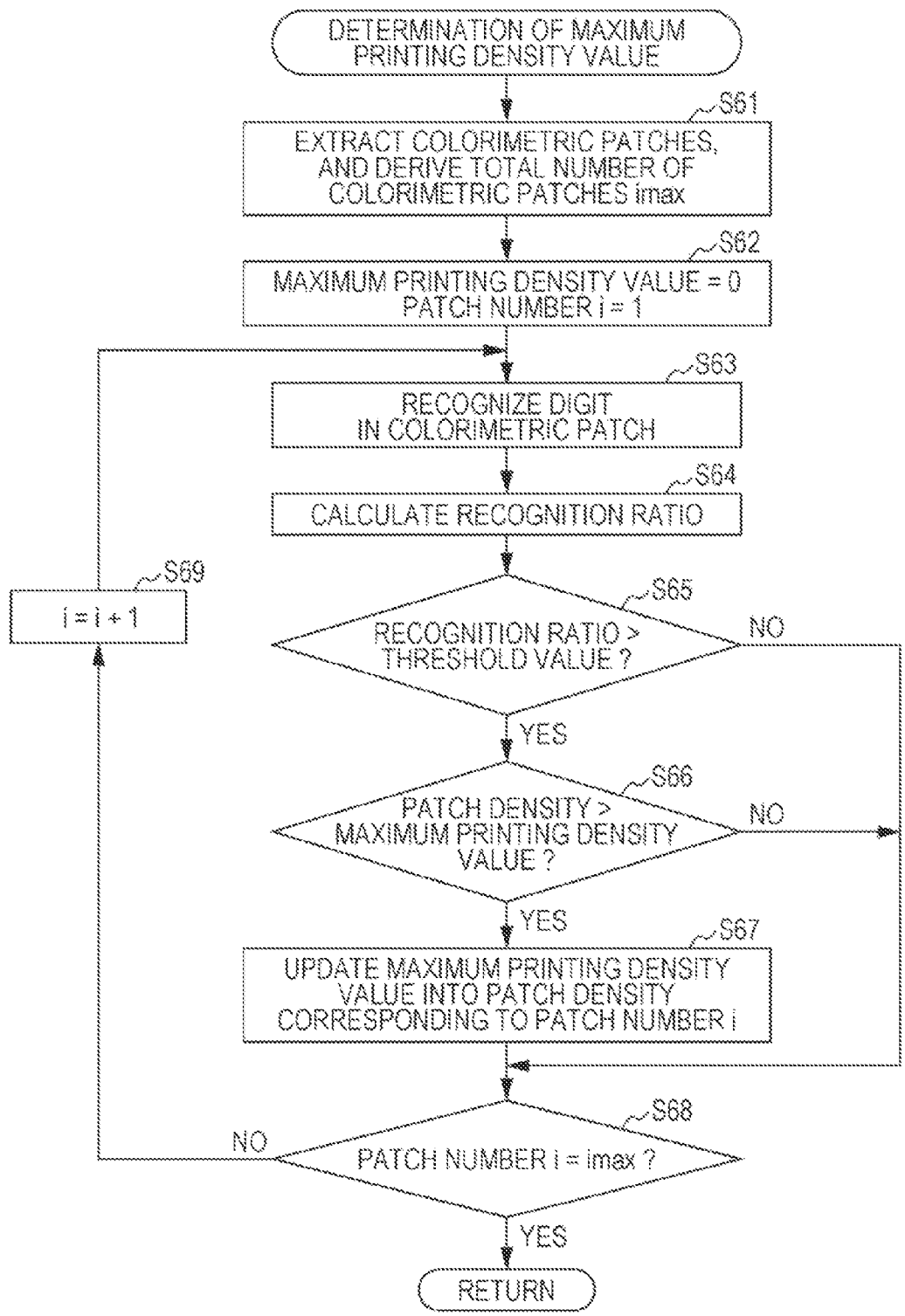
FIG. 5 is a flowchart illustrating an example of processing for determining a maximum printing density value.

FIG. 5 is a flowchart illustrating an example of processing for determining a maximum printing density value. Upon receipt of the set of image rata from the scanner 50, the printing density determination module 146 performs maximum printing density value determination processing described below. First, the printing density determination module 146 extracts pieces of image data each associated with a corresponding one of the colorimetric patches 42 from the received set of image data, and acquires a total number of the colorimetric patches 42 imax (step S61). Further, a maximum printing density value and a patch number i are each set to an initial value. Specifically, the maximum printing density value and the patch number i are respectively set to "zero" and "1" (step S62). Further, a series of processes (steps S63 to S69) are performed on each of the colorimetric patches 42.

In step S63, a digit (symbol) contained in a colorimetric patch 42 corresponding to the patch number i is recognized on the basis of a corresponding piece of image data. Further, a recognition ratio is calculated on the basis of a digit having been recognized in step S63 and a digit having been written in the relevant colorimetric patch (step S64). Subsequently thereto, it is determined whether or not the calculated recognition ratio exceeds a preset threshold value (for example, a reference recognition ratio 90%) (step S65). This reference recognition ratio can be set in view of the degree of the deformation of the outline digit due to the blurring and leaking of ink. Further, when the calculated recognition ratio exceeds the reference recognition ratio, it can be determined that any one of the blurring, the leaking, and any other unfavorable phenomenon in relation to ink does not occur; while in contrast, when the calculated recognition ratio is smaller than or equal to the reference recognition ratio, it can be determined that one or more of the blurring, the leaking, and any other unfavorable phenomenon in relation to ink occur. Thus, in this embodiment, when the result of the determination in step S65 is "YES", the process flow is caused to further proceed to step S66, and it is determined whether or not the patch density of the colorimetric patch 42 corresponding to the patch number i exceeds the maximum printing density value. Further, when the result of the determination in step S66 is "YES", the maximum printing density value is updated into the relevant patch density, the relevant updated value is stored in the HDD 11 (step S67), and then, the process flow is caused to proceed to step S68. In contrast, when the result of the determination in step S65 or step S66 is "NO", the process flow is caused to proceed to step S68 in a state in which the update of the maximum printing density value (step S67) is not performed and the maximum printing density value remains as it is.

In step S68, it is determined whether or not the current patch number i coincides with the total number imax. Further, when the patch number i does not come to the total number imax, that is, when at least one colorimetric patch 42 is not yet subjected to the process of recognition of a corresponding digit and any other processes, the patch number i is incremented by "1" (in step S69), and then, the process flow is returned to step S63. Thereafter, the series of processes in steps S63 to S68 are repeated. In contrast, when the result of the determination in step S68 is "YES", that is, when the maximum printing density value determination processing based on all of the colorimetric patches 42 has been completed, as shown in FIG. 3, the process flow is caused to proceed to step S7.

In step S7, the LUT correction module 147 corrects the LUT 112 to allow the printer 30 to perform printing using the maximum printing density value having been determined in such a way as described above. That is, a pre-correction LUT 112 is read from the HDD 11. This pre-correction LUT 112 is a table in which each of pieces of RGB data is associated with a corresponding one of pieces of CMYK data using a pre-update maximum printing density value. Next, the latest maximum printing density value 114, stored in the HDD, is read, and the LUT 112 is corrected so as to correspond to the latest maximum printing density value 114. Further, a post-correction LUT 112 is written into the HDD 11 again to correct the LUT 112. Thereafter, the process flow is caused to return to step S3, where the printer driver 14 displays the printing interface screen again, and is in a state of being ready for receiving operation inputs using the various buttons.

In step S3, upon click operation of the printing button, the printer driver 14 reads the set of image data 111, stored in the HDD 11, and supplies the printer 30 with the set of printing data PD, for use in allowing the printer 30 to perform printing. Subsequently thereto, for example, an image shown in FIG. 1 and corresponding to the set of image data 111 is printed on the medium 40 by the printer 30. More specifically, the printer driver 14 reads the set of image data 111, which represents an image to be printed, from the HDD 11 (step S8). Here, the set of image data 111 may be a set of image data read from the scanner 50, a digital camera (not illustrated), a video camera (not illustrated), or any other device, or may be a set of image data recorded in a recording medium. Further, when the set of image data is input from a digital camera or any other device, the entire data is not needed to be read in a lump but may be partially read. In a case where the printer driver 14 is invoked by an application program capable of generating image information or any other information, only a pointer indicating a buffer area for use in transferring data may be transferred from the application program to the printer driver.

In next step S9, the printer driver 14 convers the resolution of the set of image data 111 in accordance with the resolution of the printer 30. There are various kinds in the set of image data 111, and thus, the set of image data 111 is converted into a set of image data represented by 256 grayscale levels within a broadband RGB color space on the basis of a definition, such as a sRGB, in accordance with the kind of the set of image data 111.

Subsequently thereto, the printer driver 14 reads an LUT 112 from the HD 11 (step S10). This LUT 112 corresponds to the medium type or any other information having been selectively input on the printing interface screen. The relevant LUT 112 is the corrected LUT, having been reestablished from the pre-correction LUT as shown in FIG. 3. Further, the printer driver 14 converts pieces of RGB grayscale data each associated with a corresponding one of pixels and constituting the set of image data 111 into pieces of CMYK grayscale data.

Next, the printer driver 14 binarizes the set of CMYK data represented by 256 grayscale levels through the halftone processing to generate a set of CMYK data represented by two grayscale levels (step S11). Further, the printer driver 14 rearranges the set of CMYK data represented by two grayscale levels through rasterization processing (step S13). Further, the printer driver 14 outputs the set of printing data PD including the relevant set of CMYK data to the printer 30 (step S13). Further, the printer 30 receives the set of CMYK data, representing the color image 41, and drives the head unit 32 (FIG. 2) so as to allow the head unit 32 to discharge the inks onto the medium 40 on the basis the set of CMYK data to print the image 41 (FIG. 1) based on the set of image data 111.

As described above, in this embodiment, the plurality of colorimetric patches 42 (the twelve colorimetric patches 42 in this embodiment), having mutually different densities, are printed on the medium 40 to determine a maximum printing density value, and further, the low density portion 422 is provided in each of the colorimetric patches 42, and thus, the following behavior effects are brought about. That is, although the amount of ink used for printing a colorimetric patch 42 having a relatively high density among the plurality of colorimetric patches 42, for use in the determination of the maximum printing density value, is likely to exceed the ink absorption amount of the medium 40, ink having exceeded the ink absorption amount is flown into the low density portion 422 and is trapped, for example, as shown in the lower-right portion of FIG. 4. This configuration, therefore, enables the occurrence of blurring and leaking of ink from the relevant colorimetric patch 42 to be effectively prevented.

Further, in this embodiment, the plurality of low density portions 422 are disposed so as to be distributed in the whole of each of the colorimetric patches 42, and thus, even when the blurring and leaking of ink occur in any portion of the base portion 421, this configuration enables such ink to be trapped by a corresponding low density portion 422 with certainty.

Further, each of the low density portions 422 is provided with a corresponding one of the outline digits ("0", "1", "2", . . . , and "9") relative to the base portion 421, serving as a background. Further, the low density portion 422 (the outline digit) of each of the colorimetric patches 42 is recognized on the basis of a corresponding one of the images having been acquired by imaging the colorimetric patches 42, and it is determined whether or not the patch density of the each of the colorimetric patches 42 is appropriate on the basis of a recognition ratio in relation to the low density portion 422 (the outline digit). This configuration, therefore, enables a determination as to whether or not the amount of discharged ink is appropriate to be made reasonably and with high reproducibility. Accordingly, this configuration enables a maximum density value to be determined with high reproducibility without causing any one of defects, such as cockling.

Further, as shown in FIG. 5, the processes from step S63 to S69 are repeated a plurality of times equal to the total number of the colorimetric patches 42 imax to obtain colorimetric patches 42 for each of which a corresponding outline digit has been recognized with a high recognition ratio. Further, among the obtained colorimetric patches 42, a colorimetric patch 42 having a maximum density is obtained, and the density of the obtained colorimetric patch 42 is determined as the maximum printing density value. This configuration, therefore, enables a maximum printing density value to be determined so as to allow the maximum printing density value to be close to the limit and not to exceed the ink absorption amount of the medium 40. As a result, this configuration enables an image corresponding to the set of image data to be printed with high quality in a state the variation of the density of the image is broadened.

Further, the densities of base portions 421 are changed for each of the colorimetric patches 42 to make the patch densities of the plurality of colorimetric patches 42 different from one another, and the density of each of the low density portions 422 is set to a value smaller than a minimum value of the densities of the base portions 421 (for example, in FIG. 4, the minimum value being equal to "25"). More specifically, no ink is discharged onto each of the low density portions 422 to make the density thereof "zero" so as to allow the outline digit to be formed. Thus, in any one of the colorimetric patches 42, as described above, the ink flown from the base portion 421 is trapped by the low density portions 422 with certainty, and this configuration enables the occurrence of the blurring and leaking of ink from the relevant colorimetric patch 42 to be effectively prevented. In addition, in substitution for the setting of the density of each of the low density portions 422 to zero, the density of each of the low density portions 422 may be set so as to satisfy the following formula:

$$0<(\text{Density of Low Density portion 422})<25$$

Further, in each of the colorimetric patches 42, a plurality of the low density portions 422 (forty low density portions 422 in FIG. 40) are disposed relative to the base portion 421 so as to allow a plurality of symbols to be two-dimensionally distributed and contained in the each of the colorimetric patches 42. This configuration, therefore, enables increase of the accuracy of recognizing the outline digits, and as a result, this configuration enables the maximum printing density value to be determined with high accuracy.

Further, the outline digits, each formed by a corresponding one of the low density portions 422, are image-recognized to obtain the recognition ratio, and thus, in this image recognition, an already-known highly accurate engine can be used as it is. Thus, the use of such a highly accurate engine increases the accuracy of the recognitions of the outline digits, each constituted by a corresponding one of the low density portions 422, and contributes to further increase of the accuracy of the maximum printing density value. This advantage is the same in a case where a letter is formed by the lower density portion 422, as described below.

In addition, step S4, step S5, and step S6 shown in FIG. 3 in this embodiment respectively correspond to an example of a "first process", an example of a "second process", and an example of a "third process" of the invention. Further, the outline digit, formed by the low density portion 422, corresponds to an example of a "symbol" of the invention. Further, the patch data supply module 145 corresponds to an example of a "patch control section" of the invention; the printing density determination module 146 corresponds to an example of a "printing density determination section" of the invention; and the computer 10, which includes these components, serves as a "density determination apparatus" of the invention. Further, the scanner 50 corresponds to an example of an "imaging section" of the invention.

Figure 6:
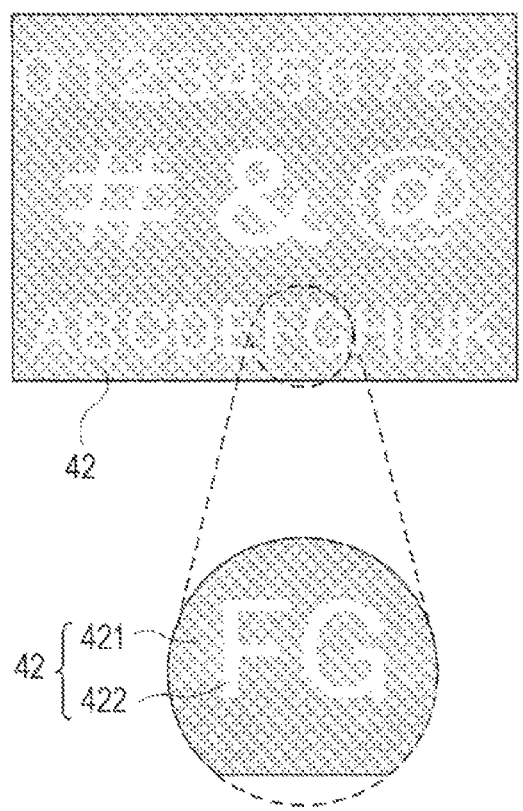
FIG. 6 is a diagram schematically illustrating another example of colorimetric patches.

It is to be noted that the invention is not limited to the aforementioned embodiment, and various modifications may be made on the aforementioned embodiment within the scope not departed from the gist of the invention. For example, in the aforementioned embodiment, as shown in FIG. 4, a digit is formed as an example of the symbol by the low density portion 422 and the digit is a target of the recognition, but the target of the recognition is not limited to the digit, and a symbol suitable for the image recognition may be used. For example, the colorimetric patches 42 may be printed in such a form as shown in FIG. 6. That is, other kinds of symbols, such as a letter and a mark, may be formed by the low density portion 422. Further, the digit, the letter, the mark, and any other symbol may be mixed. Further, the sizes of the low density portions 422 may not be the same as needed.

Figure 7:
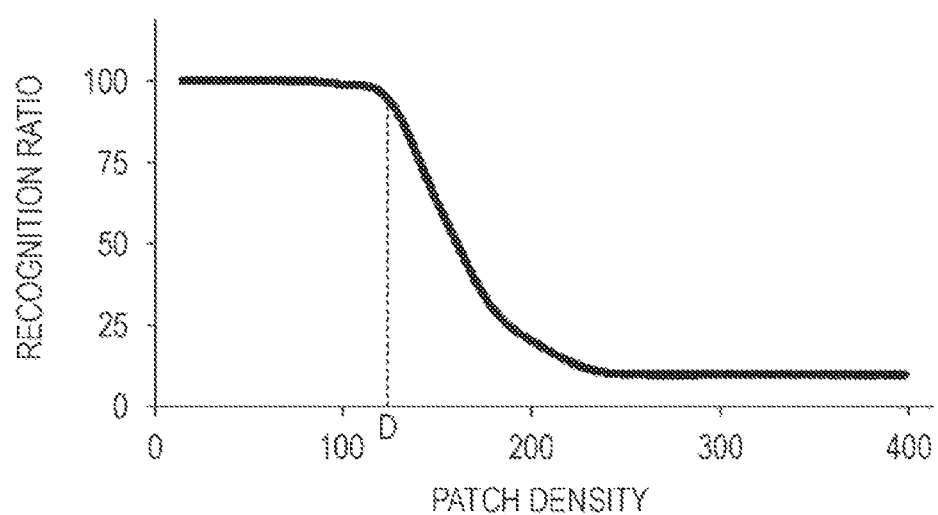
FIG. 7 is a diagram illustrating another example of processing for determining a maximum printing density value.

Further, in the aforementioned embodiment, the maximum printing density value is determined by comparing each of recognition ratios with a threshold value, but a method of determining the maximum printing density value is not limited to such a method. For example, as shown in FIG. 7, recognition ratios each associated with a corresponding one of the colorimetric patches 42 are obtained, and a patch density D, that is, a patch density at the time when the variation of the recognition ratio relative to the increase of the patch density is drastically increased in a descending direction, may be determined as the maximum printing density value, or a patch density desired by a user may be made settable as the threshold value.

Further, in the aforementioned embodiment, the patch images are obtained by allowing the scanner 50, which is installed separately from the printer 30, to image the colorimetric patches 42, but when an imaging means, such as a colorimetric sensor, is mounted in the printer 30, the printer 30 may be configured to not only perform printing of the colorimetric patches 42, but also perform imaging of the colorimetric patches 42 to transmit the patch images thereof to the computer 10.

The density determination apparatus and the peripheral devices, these apparatus and devices being are capable of executing the density determination program according to the invention, are able to be variously configured. For example, the printer may be a printer integrated with a computer, or may be an exclusive printer that performs printing of only a single-color image. The above-described process flow is not only executed inside the computer 10, but also may be configured to allow part of or the whole of the process flow to be executed by the printer or an exclusive image output device.

Moreover, the density determination program, which executes the density determination method according to the aforementioned embodiment, may be configured so as to be stored in a storage medium, such as a CD-ROM, a magneto-optical disc, or a nonvolatile memory card, be read as codes from the storage medium, and be executed by a computer. Further, the density determination program may be downloaded from a predetermined server via the internet and be executed by coupling a communication I/F, such as a modem, to the Internet and allowing the communication I/F to access the predetermined server. That is, the recording medium recording, in which the above program is recorded, as well as the computer program itself, is one of embodiments of the invention.

This application claims priority under 35 U.S.C. §119 to Japanese Patent Application No. 2015-224723, filed Nov. 17, 2015. The entire disclosure of Japanese Patent Application No. 2015-224723 is hereby incorporated herein by reference.

What is claimed is:

1. A density determination method comprising:
a first process of discharging ink onto a medium to print a plurality of colorimetric patches having mutually different densities on the medium so as to allow each of the colorimetric patches to include a base portion serving as a background of the each of the colorimetric patches and a low density portion forming a symbol and having a density lower than a density of the base portion, and;
a second process of acquiring images each associated with a corresponding one of the colorimetric patches; and
a third process of determining a maximum printing density value for the medium on the basis of a result of recognizing the symbol through each of the images, having been acquired in the second process.

2. The density determination method according to claim 1, wherein the third process includes a process of acquiring a colorimetric patch having a highest density among at least one colorimetric patch which constitutes the colorimetric patches and for each of which the symbol has been recognized, and determining that a density at a time when the acquired colorimetric patch, having the highest density, has been printed on the medium, is the maximum printing density value.

3. The density determination method according to claim 1, wherein, in the first process, a density of the base portion is set so as to be changed for each of the colorimetric patches to make the densities of the colorimetric patches different from one another, and a density of the low density portion is set to a density lower than the density of the base portion of any one of the colorimetric patches.

4. The density determination method according to claim 3, wherein, in the first process, the colorimetric patches are printed on the medium by discharging the ink onto only the base portion.

5. The density determination method according to claim 1, wherein, in each of the colorimetric patches, a plurality of the low density portions are provided relative to the base portion.

6. The density determination method according to claim 5, wherein the plurality of low density portions are disposed so as to be two-dimensionally distributed relative to the base portion.

7. The density determination method according to claim 1, wherein the symbol corresponds to either a letter or a digit for each of the colorimetric patches.

8. The density determination method according to claim 1, wherein, in the third process, when, with an increase of the density of each of the colorimetric patches, a recognition ratio in relation to the symbol begins to decrease at a specific colorimetric patch among the colorimetric patches, a density of the specific colorimetric patch is determined as the maximum printing density value.

9. A density determination apparatus comprising:
a patch control section configured to control a printing apparatus that performs printing by discharging ink onto a medium to allow the printing apparatus to print a plurality of colorimetric patches having mutually different densities on the medium so as to allow each of the colorimetric patches to include a base portion serving as a background of the each of the colorimetric patches and a low density portion forming a symbol and having a density lower than a density of the base portion; and a printing density determination section configured to determine a maximum value of the densities each associated with a corresponding one of the colorimetric patches on the basis of a result of recognizing the symbol through an image of each of the colorimetric patches, printed on the medium.

10. The density determination apparatus according to claim 9 further comprising an imaging section configured to acquire the images, each associated with a corresponding one of the colorimetric patches, by imaging the colorimetric patches, printed on the medium, and to supply the acquired images to the printing density determination section.

11. A program recording medium configured to record a density determination program that allows a computer incorporated in or coupled to a printing apparatus that performs printing by discharging ink onto a medium to execute processing and to be readable by the computer comprising:

a process of printing a plurality of colorimetric patches having mutually different densities on the medium so as to allow each of the colorimetric patches to include a base portion serving as a background of the each of the colorimetric patches and a low density portion forming a symbol and having a density lower than a density of the base portion;

a process of acquiring images each associated with a corresponding one of the colorimetric patches, printed on the medium; and a process of determining a maximum printing density value for the medium on the basis of a result of recognizing the symbol through each of the acquired images.

* * * * *